United States Patent
Quach et al.

(10) Patent No.: US 7,219,167 B2
(45) Date of Patent: May 15, 2007

(54) ACCESSING CONFIGURATION REGISTERS BY AUTOMATICALLY CHANGING AN INDEX

(75) Inventors: Tuan M. Quach, Fullerton, CA (US); Reza E. Daftari, Tustin, CA (US)

(73) Assignee: Intel Corporation, Santa Clara, CA (US)

( * ) Notice: Subject to any disclaimer, the term of this patent is extended or adjusted under 35 U.S.C. 154(b) by 479 days.

(21) Appl. No.: 10/671,973

(22) Filed: Sep. 25, 2003

(65) Prior Publication Data

US 2005/0086463 A1  Apr. 21, 2005

(51) Int. Cl.
G06F 3/00 (2006.01)
G06F 9/00 (2006.01)

(52) U.S. Cl. ............... 710/8; 710/10; 710/62; 713/1; 713/2

(58) Field of Classification Search ............ 710/8–14; 713/1, 2
See application file for complete search history.

(56) References Cited

U.S. PATENT DOCUMENTS

| | | |
|---|---|---|
| 5,961,611 A | 10/1999 | Oh |
| 6,336,152 B1 | 1/2002 | Richman et al. |
| 6,407,960 B1 | 6/2002 | Egbert et al. |
| 6,553,439 B1 * | 4/2003 | Greger et al. ............ 710/62 |
| 6,697,076 B1 * | 2/2004 | Trivedi et al. ............ 345/568 |

FOREIGN PATENT DOCUMENTS

EP  0 676 687 A2  10/1995
WO  WO 03/058439 A2  7/2003

OTHER PUBLICATIONS

PCT International Search Report (dated Jan. 25, 2006)-International Application No. PCT/US2004/031399-International Filing Date Sep. 23, 2004 (12 pages).
"Intel ® 440BX AGPset: 82443BX Host Bridge/Controller"Datasheet, Apr. 1998, Order No. 290633-011, Copyright ©Intel Corporation, 1997-1998 (pp. i-ix; and "Register Description"Chapter 3, pp. 3-1 to 3-59).

* cited by examiner

Primary Examiner—Kim Huynh
Assistant Examiner—Alan S. Chen
(74) Attorney, Agent, or Firm—Blakely, Sokoloff, Taylor & Zafman LLP

(57) ABSTRACT

An embodiment of the invention is directed to a method for accessing configuration registers. An indication that an attempt has been made to access a first register is received. This first register reflects an index variable that points to a configuration register. Next, an indication that an attempt has been made to access a second register is received. This second register reflects part of the contents of a configuration register to which the index variable points. Next, without waiting for another attempt to access the first register, the index variable is changed to point to another configuration register. Other embodiments are also described and claimed.

24 Claims, 5 Drawing Sheets

| ADDR | CONTENT |
|---|---|
| 1 | |
| 2 | |
| 3 | |
| 4 | |
| 5 | |
| 6 | |
| 21 | |
| 54 | |
| 55 | |
| 56 | |
| 57 | |
| 58 | |
| 59 | |
| 104 | |
| 174 | |
| 175 | |
| 176 | |
| 177 | |
| 178 | |
| 179 | |
| 180 | |

PROGRAM IN BLOCK MODE: addresses 1–6
PROGRAM IN NORMAL MODE: address 21
PROGRAM IN BLOCK MODE: addresses 54–59
PROGRAM IN NORMAL MODE: address 104
PROGRAM IN BLOCK MODE: addresses 174–180

CONFIGURATION REGISTERS

FIG. 3

ACCESSING CONFIGURATION REGISTERS BY AUTOMATICALLY CHANGING AN INDEX

BACKGROUND

An embodiment of the invention described below is related to accessing software-accessible registers that are used to configure the functions of a computer system, including one or more of its integrated circuit components.

A computer system is composed of several primary integrated circuit (IC) components, typically including a processor such as a PENTIUM processor by Intel Corp., Santa Clara, Calif., and a main memory. In many cases, a system interface component (also referred to as a system chipset) is also used, to allow the processor to communicate with a broad range of other IC components and peripherals, such as a graphics subsystem, a network interface controller, and a mass storage device. Each IC component is designed to implement certain functions that work together to help the system achieve its overall purpose.

Of the primary IC components described above, the system chipset may have the most number of different functions to support. That is because the system chipset in many cases acts as a communications bridge between not only the processor and other IC components, but sometimes also between the peripherals and main memory. To use IC manufacturing resources more efficiently, a single system chipset is often designed to be flexible enough to support different types of processor, memory, and peripheral combinations. This flexibility is achieved by designing the system chipset with configurable, internal hardware whose configuration and functionality is set according to the contents of a number of internal, software-accessible registers (also referred to as configuration registers). After applying power to a given computer system, the configuration registers in the system chipset (and also those in other primary IC components such as the processor and memory) are written with their desired values, typically under the control of an operating system program.

In the case of the 82443BX host bridge/controller chipset by Intel Corp., the programming of a configuration register (also referred to as programming in configuration space) may be as follows. There are two control registers that are accessible from the host/central processing unit (CPU) I/O address space, namely a Configuration Address Register (CONFADD, also referred to by its hex address CF8) and a Configuration Data Register (CONFDATA, also referred to by its hex address CFC). Access to any of the configuration registers is by first accessing the CONFADD and identifying the selected register (by appropriately writing to the CONFADD to "point" to the selected register). Next, an access is performed to the CONFDATA which contains the current value of the selected register, to write a new value. The selected register will then be updated accordingly. To program another configuration register, the same dual access operation is repeated to first point to the next register (by writing to the CONFADD), and then request an update to it (by writing the new value to the CONFDATA).

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

FIG. 3 illustrates three groups of configuration registers that may be programmed separately in block mode.

DETAILED DESCRIPTION

It has been found that the number of configuration registers in a computer system's primary IC component, particularly a system chipset, are likely to increase significantly for future computer architectures. For example, in a chipset that supports a system interconnect of point-to-point links (to multiple processors, other IC components, and peripherals), there may be several hundred registers to verify and/or program upon each system initialization. In addition, these registers may become wider in the future, so that an even greater amount of configuration data will need to be programmed. Finally, in most cases, the bus protocol and bus cycles traditionally defined for accessing configuration registers are relatively slow, compared to those aimed at accessing memory, for instance, because there was no perceived need for a fast configuration process. These factors together are expected to significantly slow down the process of initialization in future computer systems.

Figure 1:
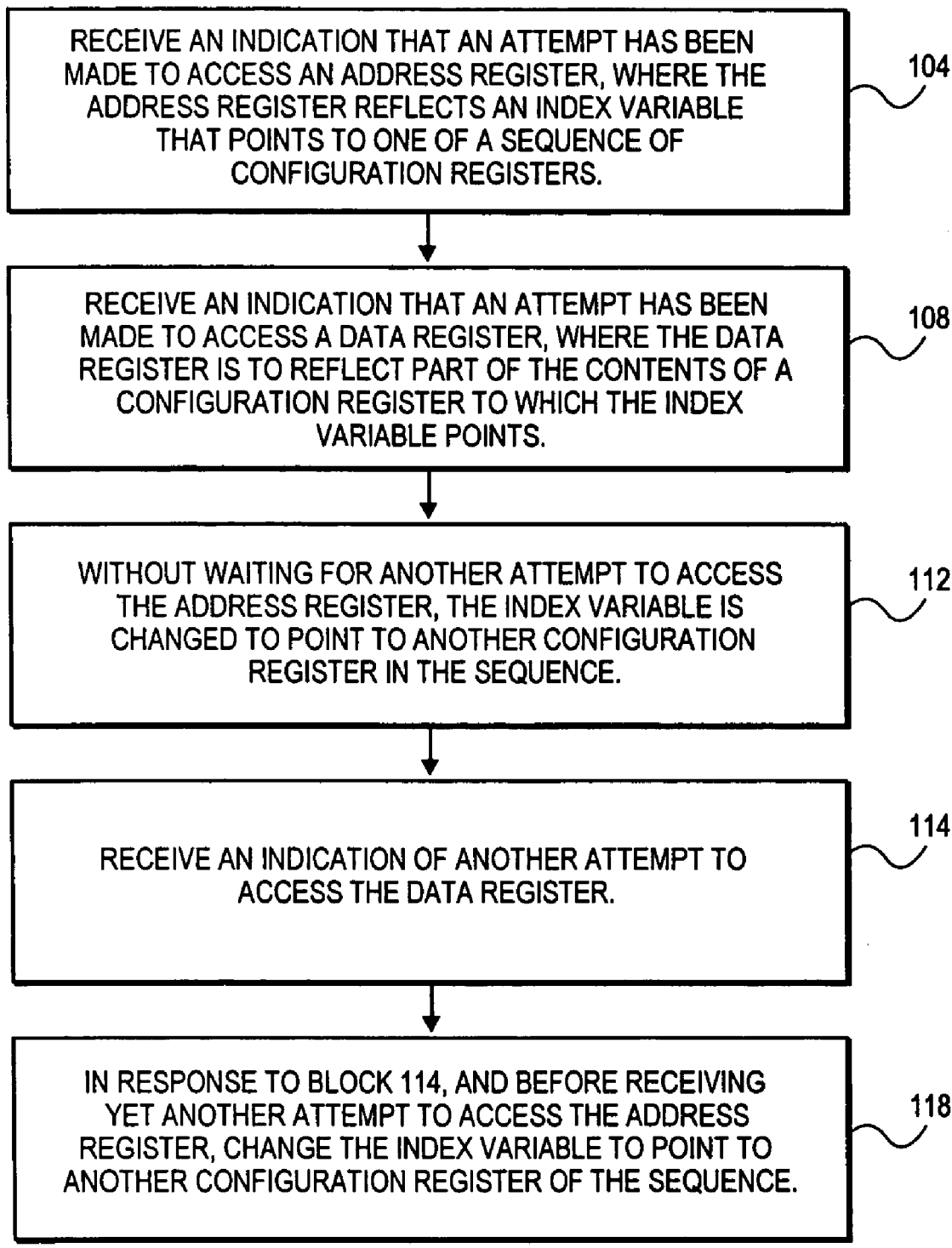
FIG. 1 is a flow diagram of a method for accessing a sequence of configuration registers that may accelerate the process of initializing a computer system.

Turning now to FIG. 1, a flow diagram of a method for accessing a sequence of configuration registers is shown that may accelerate the process of initializing a computer system. FIG. 1 depicts operations that may be performed by the "receiver", for example a system chipset component in which the configuration registers and associated hardware for programming them are located. In contrast, FIG. 2 described below refers to a method for accessing the configuration registers, from the point of view of the "transmitter", e.g. a programmed host/CPU. Beginning with FIG. 1, operation may start with receiving an indication that an attempt has been made to access an address register (operation 104). The address register may, for example, be the CONFADD at hex address CF8 mentioned above. The access may be an attempt to write a given index value that points to a given configuration register of the sequence. Alternatively, the attempt may be to read an index value from the address register. In either case, operation proceeds with block 108.

In block 108, an indication is received that an attempt has been made to access another register, referred to here as the data register. For example, this attempt may be an attempt to write a given content value that is to be part of the content of a given configuration register. Next, operation proceeds with changing the index variable to point to another configuration register of the sequence (block 112). This is done without waiting for another attempt to access the address register. In other words, the index is automatically changed to point to another configuration register. This helps accelerate the overall process of programming the configuration registers, because it avoids the additional attempt to access the address register for each subsequent configuration register. This mode of operation for an integrated circuit (IC) component is also referred to here as a special or block mode of operation.

Figure 2:
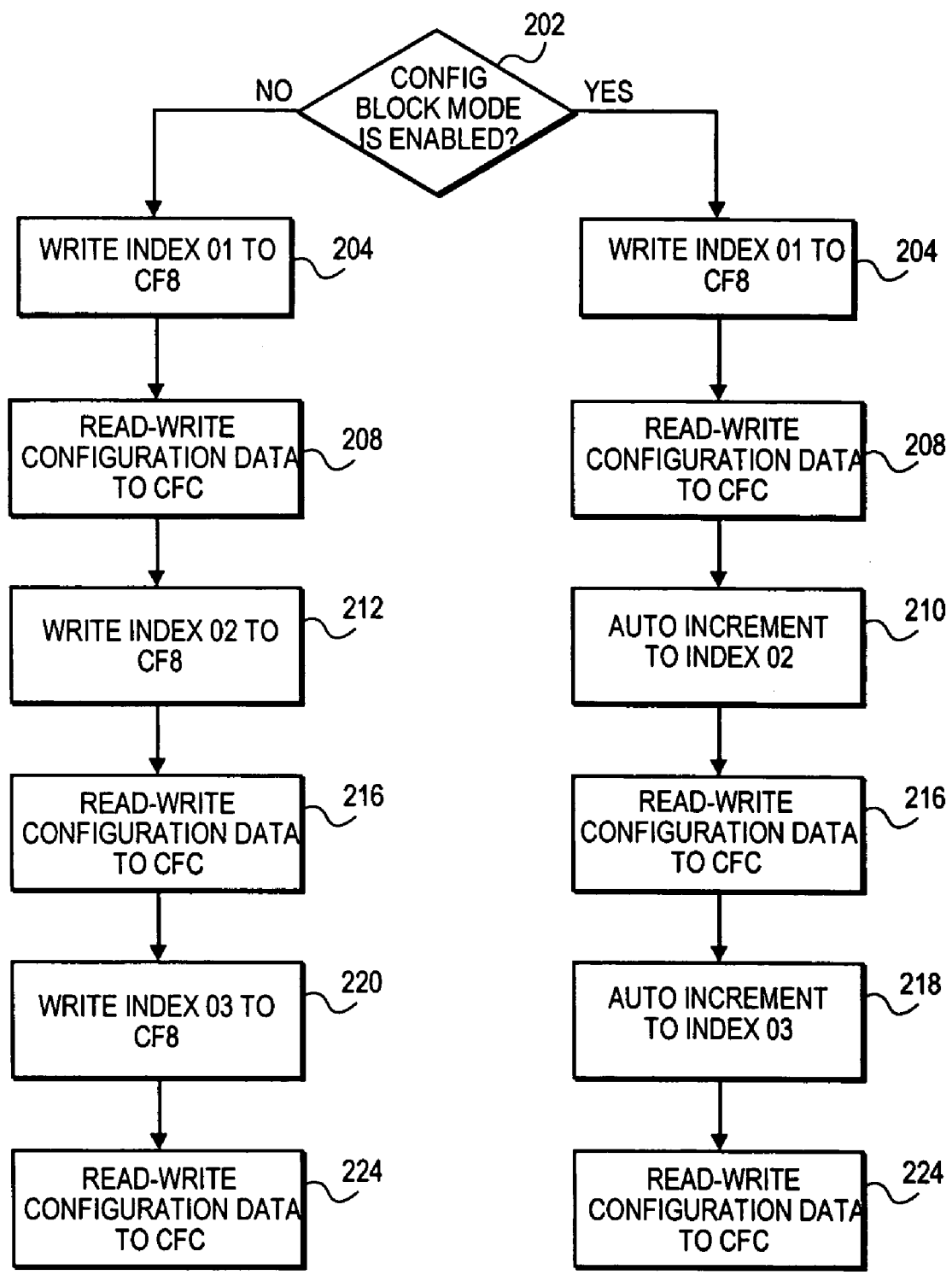
FIG. 2 shows two different methods for accessing the configuration registers, from the point of view of the "transmitter", e.g. a programmed host/CPU.

There are several variations to the process described above. First, one or both of the given index and content values, as they have been written to the address and data registers, respectively, may be encoded. An example will be given below in connection with the computer system shown in FIG. 4 in which the index value is extracted or derived from a combination of several fields of an address register. In addition, the automatic changing of the index variable may be allowed, for example, only if the block mode of operation, for programming the sequence of registers via automatic indexing, has been previously entered. Examples of normal and block mode processes are shown in FIG. 2. Yet another variation is that the change in the index variable may be a fixed increment or a decrement so that the registers of the sequence are programmed sequentially according to ascending or descending addresses. Finally, the index variable may be implemented by a logic structure (e.g., a counter or register) separate from the address register. Other variations are also possible.

The method described above for accessing a sequence of two or more configuration registers continues, as shown in FIG. 1, with receiving an indication of another attempt to access the data register (block 114). Next, in response to receiving the further indication in block 114, and before receiving yet another attempt to access the address register, the index variable is changed to point to yet another configuration register in the sequence (block 118). The operations in blocks 114 and 118 may be repeated as indications of further attempts are received to access the data register, to point to still further configuration registers in the sequence.

Note that the process described above is suitable for programming, which includes new content values being actually written into the selected configuration registers (based upon the content of the data register). In addition, although the operations described above refer to receiving indications that attempts have been made to access either the address or data registers, this should be understood as including not just, for example, detecting certain types of bus events (e.g., a special bus transaction aimed at the address and/or data registers), but also detecting, for example, with respect to block 104, that the address register has, in fact, been written with a new index value. Similarly, as to block 108, receiving an indication that an attempt has been made to access the data register may be that a particular bus event aimed at the data register has been detected, or that a new content value has been written to the data register. Other ways of receiving an indication that an attempt has been made to access a register may be used.

Turning now to FIG. 2, a flow diagram for a method of programming configuration registers is shown, from the point of view of the transmitter (e.g., host/CPU). There are actually two different processes depicted, where depending upon whether the block mode has been enabled (block 202), one or the other process may be performed. In this example, the same set of configuration registers are programmed in both processes. In the process depicted on the left side of FIG. 2 (the normal mode of operation), three configuration registers at index values 01, 02, and 03 are programmed in accordance with blocks 204–224. It should be noted that in this process, a dual stage operation is performed for each register. For example, to program the register at index value 01, blocks 204 and 208 are performed in that sequence where first the index value is written to the address register (appearing in this embodiment at hex address CF8) followed by a read or a write of the configuration data or content value to the data register (at hex address CFC).

In contrast to the process on the left of FIG. 2, the one on the right takes advantage of automatic indexing by essentially eliminating in this embodiment the operations described in blocks 212 and 220, and replacing them with an automatic increment to the next sequential index (blocks 210 and 218). Where there are relatively large numbers of configuration registers to be programmed, there is a substantial savings in time associated with eliminating an entire write operation to the address register CF8.

Note that the IC component which supports the methodology depicted in FIG. 2 may have two modes of operation for programming the configuration registers, one of which is the block mode as exemplified in the right hand flow of FIG. 2 while the other is the normal mode shown in the left side of the figure. The IC component may thus be designed with a further register that is accessible to software, for programmably enabling or disabling the block mode of operation. This allows different groups of configuration registers to be programmed in different modes, at a substantial time savings. For example, a relatively large, first group of registers are programmed sequentially in block mode. The IC component may then be returned to normal mode for jumping to the first register of the next group (which does not follow sequentially the first group). This ability is depicted in FIG. 3 where first the group with indexes or addresses 1–6 is programmed in block mode; then the IC component is placed in normal mode to program the register at address 21; followed by block mode to program the registers at addresses 54–59; and then normal mode is entered to program the lone register at address 104, followed by block mode to program the registers 174–180 sequentially.

Figure 4:
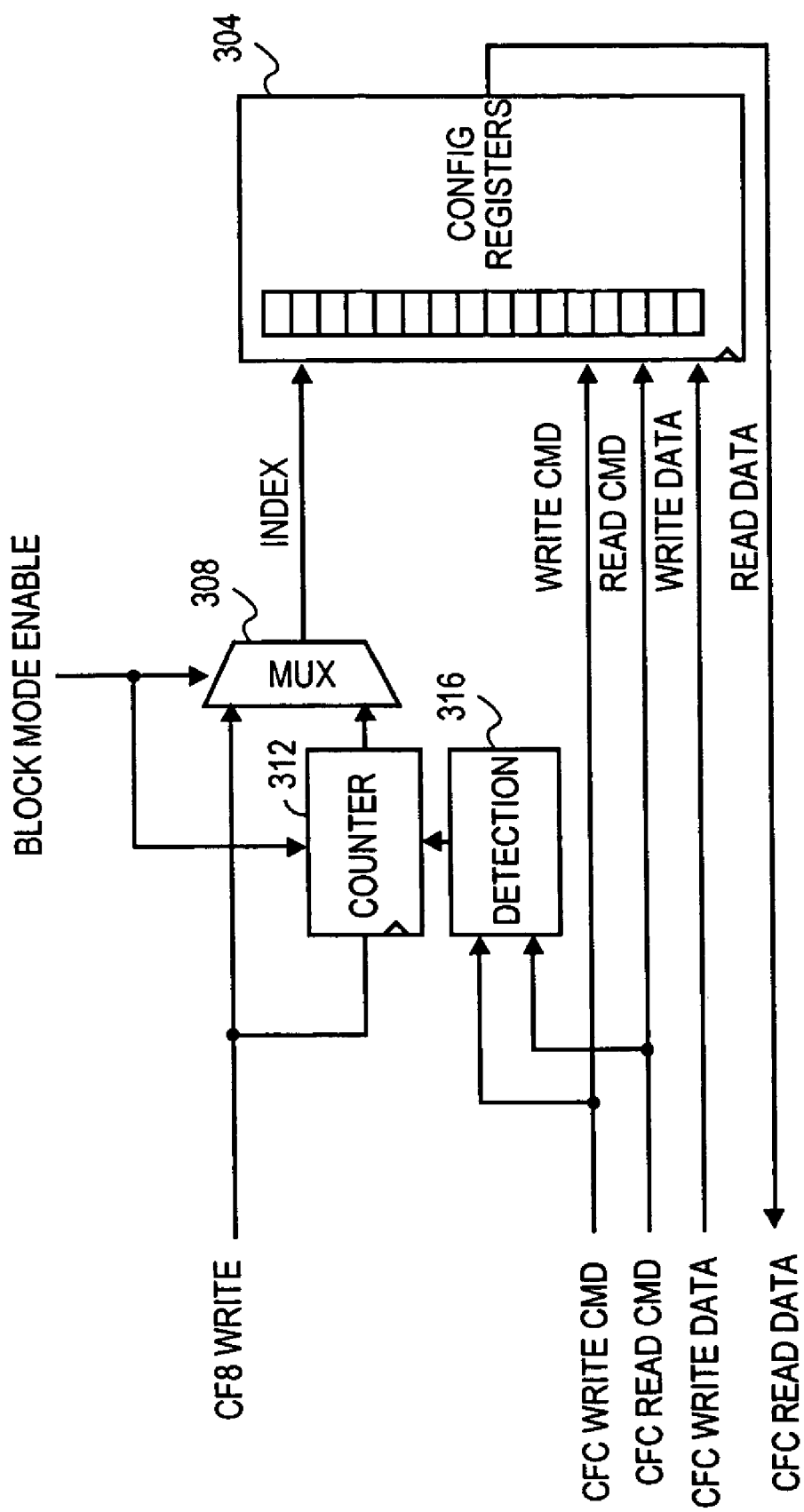
FIG. 4 is a logic diagram of part of an IC component that allows for automatic indexing of configuration registers.

Turning now to FIG. 4, a logic diagram of part of an IC component that allows for automatic indexing of configuration registers is shown. The IC component may be a system chipset, a processor, or other primary IC component of a computer system. A number of configuration registers 304 are provided in the IC component, for example, on-chip with some core logic of the IC component (not shown). Every one of these registers 304 may be indexed by an output of multiplexor logic 308. Once indexed or selected, some or all of the contents of the selected register (which is also referred to in the figure as "data") may be transferred to a data register (CFC, not shown) under the control of a hardware control signal CFC Read Command. Alternatively, data may be written to the selected register, under control of the hardware control signal CFC Write Command. The CFC Write and Read Commands are examples of signals which indicate that requests have been received (e.g., from outside of the IC component) to write and read, respectively, the data register (CFC).

The multiplexor logic 308 may have two inputs. A first input may receive an index value from a counter 312, while a second input may receive an index value derived directly from, in this embodiment, the address register (CF8) to which the index value has been previously written. The output of the multiplexor logic 308 is selected between the index value from the counter 312 and the index value obtained from the address register (CF8), in accordance with a block mode enable control signal which indicates a mode of operation of the IC component.

The index value provided by the counter 312 can change, by for example automatically incrementing or decrementing the counter 312. An increment or decrement signal may be provided by detection logic 316.

In operation, when the IC component is in its normal mode, the index provided to the configuration registers 304 may be derived from the contents of CF8 as it has been written by software. However, when block mode has been enabled, the index is obtained from the counter 312. Asserting the block mode enable signal allows the counter 312 to be loaded with the value obtained from CF8, which subsequently provides index values that are incremented automatically as commanded by detection logic 316. Whenever the detection logic 316 determines that a request has been received (e.g., from outside of the IC component) to access a configuration register, and in particular a CFC Write or Read Command has been detected, the counter 312 is incremented to point to the next configuration register. Other logic designs for implementing the automatic indexing capability can be used.

Figure 5:
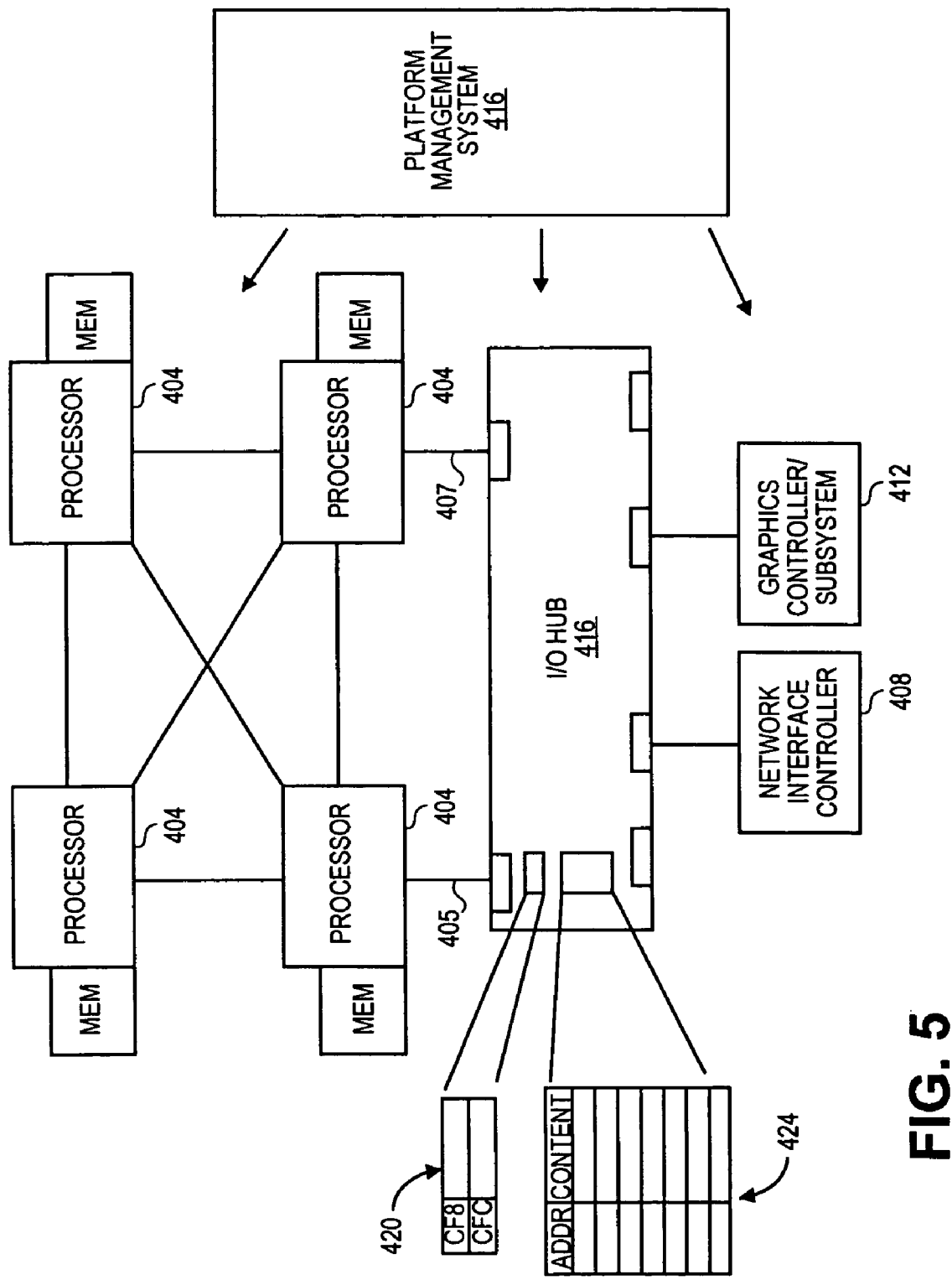
FIG. 5 depicts a block diagram of a computer system in which configuration registers of a chipset component can be programmed by automatic indexing.

Referring now to FIG. 5, a block diagram of a computer system in which configuration registers of a chipset component that can be programmed by automatic indexing is depicted. The chipset component in this embodiment is referred to as a I/O hub 416. The I/O hub 416 acts as a bridge between a processor and main memory combination 404 on one side and one or more I/O components 408, 412 on the other. In this embodiment, the I/O component 408 is a network interface controller while the component 412 is a graphics controller/subsystem. The I/O hub 416 may be equipped with additional ports that can be used to communicate with further components (not shown).

In this embodiment, there are four processor-main memory combinations 404 shown, although in general there can be one or more. Each of these processor-main memory combinations is communicatively coupled to the other by way of a separate, high speed data, point-to-point link, as shown. The point-to-point link may have one or more "lanes" where each lane may be comprised of a single trace on a printed wiring board together with associated I/O buffer circuitry (not shown), used for predominantly unidirectional communications between two of the processor-main memory combinations 404. In addition, point-to-point links are also used to communicatively couple the I/O hub 416 and the IC components 408, 412. The point-to-point links may be designed to operate in accordance with the PCI Express Base Specification 1.0a (Apr. 15, 2003).

A set of configuration registers 424 and a pair of address and data registers 420 are provided in the I/O hub 416. As an example, a configuration address register (CF8) may be defined with the following fields: port number, function number, and register number. Together, the content of these fields points, perhaps through some form of encoding, are written to a selected one of the configuration registers 424. The contents of this selected register 424 will be reflected in a configuration data register (CFC).

At least some of the confirmation registers 424 may indicate how a transaction request received on one side of the bridge that is being implemented by the I/O hub 416 is transported to another side of the bridge. The registers 424 may be designed to configure other functionality, including for example device identification, vendor identification, timers, memory control and timing, error status, scratch pad, etc. In addition, although not shown, the I/O hub 416 may also include the logic circuitry needed for implementing the automatic indexing capability described above, such as the logic design shown in FIG. 4.

A method for programming the registers 424 in block mode, using the system of FIG. 5, may be described as follows. First, a predetermined type of bus event is detected which is aimed at accessing an index variable that points to one of the registers 424. For example, the index variable may be reflected in the configuration address register (CF8) which may be mapped to a host central processing unit (CPU) I/O address space of the system, such that the CF8 is accessible by any one of the processor-main memory combinations 404. Logic in the I/O hub 416 could then be designed to monitor either of the links 405 or 407, for a bus event that is aimed at accessing the CF8.

Upon detecting such a bus event, the logic may then expect a subsequent bus event that is aimed at updating one of the registers 424 to which the index variable points. This bus event may be a transaction that targets the CFC, to read or write a content value aimed at or derived from the selected/indexed configuration register 424. Next, since the I/O hub 416 has been placed into block mode, whenever the latter bus event is detected, the logic circuitry will, without waiting for another bus event that is aimed at accessing the index variable, change the index variable to point to another one of the configuration registers 424. Note that this change in the index variable may also be reflected in the address register (CF8), where there is a subsequent read of that register. In addition, the current contents of the configuration register to which the index variable points may be reflected in the data register (CFC) when there is a subsequent read of that register. So long as block mode remains enabled, the logic circuitry may continue to change the index variable (to point to another one of the configuration registers) each time it detects a bus event aimed at accessing the data register (CFC), without requiring a bus event to update the address register (CF8).

To summarize various embodiments of a method and apparatus for accessing configuration registers by automatically changing an index have been described. In the foregoing specification, the invention has been described with reference to specific exemplary embodiments thereof. It will, however, be evident that various modifications and changes may be made thereto without departing from the broader spirit and scope of the invention as set forth in the appended claims. For example, although FIG. 5 shows the configuration and control registers 424, 420 being in the I/O hub 416 and accessed via "frontside" links 405, 407, others may be located in the processor-memory combination 404 or even in IC components 408, 412, and accessed via a platform management system 416 through a low speed bus (not shown). The specification and drawings are, accordingly, to be regarded in an illustrative rather than a restrictive sense.

What is claimed is:

1. A method for accessing configuration registers, comprising:
    a) receiving an indication that an attempt has been made to access a first control register within an integrated circuit (IC) component, the first control register to reflect an index variable that points to a configuration register of the IC component; and then
    b) receiving an indication that an attempt has been made to access a second control register of the IC component, the second control register to reflect part of the contents of a configuration register to which the index variable points; and then
    c) in response to b), and without waiting for another attempt to access the first control register, changing the index variable to point to another configuration register of the IC component.

2. The method of claim 1 wherein the attempt to access the first register is an attempt to write a given index value that points to a given configuration register, and wherein the attempt to access the second register is an attempt to write a given content value that is to be part of the content of the given configuration register.

3. The method of claim 2 wherein one of the given index and content values as written to the first and second registers, respectively, is encoded.

4. The method of claim 3 wherein both of the given index and content values as written to the first and second registers, respectively, are encoded.

5. The method of claim 2 further comprising, after c):
   d) receiving an indication of another attempt to access the second register; and then
   e) in response to d), and before receiving yet another attempt to access the first register, changing the index variable to point to yet another configuration register; and then repeating d)–e) to point to still another configuration register.

6. The method of claim 1 wherein in c), the index variable is changed only if a special mode of operation, for programming configuration registers via automatic indexing, has been entered by the IC component.

7. A method for programming a plurality of configuration registers, comprising:
   a) enabling a first mode of operation for an integrated circuit (IC) component in which a plurality of configuration registers are to be programmed according to b)–e);
   b) writing to a first control register in said IC component to enable access to a selected one of the configuration registers; and then
   c) writing to a second control register in said IC component a content value for said selected one of the configuration registers; and then
   d) writing to the second control register a further content value for another selected one of the configuration registers, without again writing to the first control register; and then
   e) repeating d) until all of the configuration registers have been programmed.

8. The method of claim 7 further comprising:
   programming a further plurality of configuration registers by
   f) disabling the first mode of operation; and then
   g) writing to the first control register to enable access to a selected one of the further configuration registers; and then
   h) writing to the second control register a content value for said selected one of the further configuration registers; and then
   repeating g)–h) until all of the further configuration registers have been programmed.

9. The method of claim 8 wherein the plurality of configuration registers are programmed sequentially.

10. An integrated circuit (IC) component, comprising:
    a plurality of configuration registers;
    a counter to provide a first index value that can change by automatically incrementing or decrementing the counter;
    multiplexor logic having a first input to receive the first index value, a second input to receive a second index value, an output coupled to index the plurality of configuration registers, the multiplexor logic to receive a control signal that indicates a mode of operation of the IC component, the mode being one in which the configuration registers are to be indexed by automatically incrementing or decrementing the counter; and
    detection logic having an input to receive a first hardware control signal that indicates a request has been received from outside of the IC component to access a configuration register, and an output to provide an increment or decrement signal to the counter.

11. The IC component of claim 10 wherein the first hardware control signal indicates that a request has been received to write a configuration data register of the IC component, and wherein the detection logic has a further input to receive a second hardware control signal that indicates a request has been received to read the configuration data register, the increment or decrement signal to be asserted in response to any one of the first and second hardware control signals being asserted.

12. The IC component of claim 10 wherein the counter has a further input to load itself with the first index value which has been obtained from a request, received from outside of the IC component, to write to a configuration address register of the IC component.

13. A computer system comprising:
    a first processor and main memory combination;
    a graphics subsystem; and
    an I/O hub communicatively coupled to the first combination via a first point to point link, and communicatively coupled to the graphics subsystem via a second point to point link,
    the I/O hub to act as a bridge between the first combination and the graphics subsystem component,
    the I/O hub having a plurality of configuration registers the contents of some of which indicate how a transaction request received on one side of the bridge is transported to another side of the bridge, and wherein
    the I/O hub further includes a counter to provide a first index value, multiplexor logic having a first input to receive the first index value, a second input to receive a second index value, an output coupled to index the plurality of configuration registers, the multiplexor logic to receive a control signal that indicates a mode of operation of the I/O hub, the mode being one in which the configuration registers are to be indexed by automatically incrementing or decrementing the counter, and detection logic having an input to receive a first hardware control signal that indicates a request has been received from outside of the I/O hub to access a configuration register, and an output to provide an increment or decrement signal to the counter.

14. The system of claim 13 further comprising a second processor and main memory combination communicatively coupled to the I/O hub via a third point to point link, and to the first combination via a fourth point to point link, and wherein the I/O hub is to act as a further bridge between the second combination and the graphics subsystem.

15. The system of claim 14 further comprising a network interface controller communicatively coupled to the I/O hub via a fifth point-to-point link.

16. The system of claim 13 wherein the I/O hub further includes a configuration address register to contain a port number, function number, and register number that together point to a selected one of the configuration registers, and a configuration data register to reflect part of the contents of the selected one of the configuration registers.

17. A method for programming software-accessible registers, comprising:
    a) detecting a first bus event, in a computer system, aimed at accessing an index variable that points to one of a plurality of software-accessible registers of the system, and a second bus event aimed at accessing the content of the software-accessible register to which the index variable points; and then b) changing to a block mode for programming some of the software-accessible registers; and then c) detecting a third bus event, in the system, aimed at updating one of the plurality of software-accessible registers to which the index variable points; and then d) in response to c), and without waiting for another bus event aimed at accessing the index variable, changing the index variable to point to another one of the plurality of software-accessible registers.

18. The method of claim 17 wherein the first bus event is to write a given index value to a first control register of the system, the given index value points to a given one of the plurality of software-accessible registers, and wherein the second bus event is to write a given content value to a second control register of the system, the system to then write the given content value to the given software-accessible register.

19. The method of claim 18 wherein the given index and content values as written to the first and second control registers, respectively, are encoded.

20. The method of claim 17 further comprising, after d):

e) detecting a fourth bus event to update said another one of the plurality of software-accessible registers; and then f) in response to e), and before receiving yet another bus event to update the index variable, changing the index variable to point to yet another one of the plurality of software-accessible registers.

21. The method of claim 18 wherein the first and second control registers are mapped to a host CPU I/O address space of the system.

22. An article of manufacture comprising:

a machine-accessible medium having data that, when accessed by a machine, initiate a) a block mode of operation in which a plurality of configuration registers are to be programmed in accordance with b)–d) below, and then b) a bus transaction to access a first control register that is to point to any one of the configuration registers, and then c) another bus transaction to access a second control register that reflects the content of any one of the configuration registers, and then d) a plurality of further bus transactions each to access the second control register without any further bus transactions to access the first control register.

23. The article of manufacture of claim 22 wherein the medium has further data that, when accessed by the machine, causes a return from said block mode to a normal mode in which a further configuration register is programmed by initiating a bus transaction to access the first control register and then another bus transaction to access the second control register.

24. The article of manufacture of claim 23 wherein the data treats the first and second control registers as being mapped to a host/CPU I/O address space.

* * * * *